United States Patent
Castorina et al.

(10) Patent No.: US 12,013,785 B2
(45) Date of Patent: Jun. 18, 2024

(54) PREFETCH OFFSET SELECTION

(71) Applicant: Arm Limited, Cambridge (GB)

(72) Inventors: Ugo Castorina, Antibes (FR); Damien Matthieu Valentin Cathrine, Mougins (FR); Marco Coletta, Antibes (FR); Igor Burovenko, Antibes (FR)

(73) Assignee: Arm Limited, Cambridge (GB)

( * ) Notice: Subject to any disclaimer, the term of this patent is extended or adjusted under 35 U.S.C. 154(b) by 37 days.

(21) Appl. No.: 17/988,892

(22) Filed: Nov. 17, 2022

(65) Prior Publication Data

US 2024/0168884 A1 May 23, 2024

(51) Int. Cl.
*G06F 12/0862* (2016.01)
*G06F 9/30* (2018.01)
*G06F 12/02* (2006.01)

(52) U.S. Cl.
CPC ...... *G06F 12/0862* (2013.01); *G06F 9/30047* (2013.01); *G06F 12/0238* (2013.01)

(58) Field of Classification Search
None
See application file for complete search history.

(56) References Cited

U.S. PATENT DOCUMENTS 6,976,147 B1 * 12/2005 Isaac .................. G06F 12/0862
711/205

* cited by examiner

*Primary Examiner* — Charles J Choi
(74) *Attorney, Agent, or Firm* — NIXON & VANDERHYE P.C.

(57) ABSTRACT

There is provided an apparatus, medium and method. The apparatus comprises candidate offset storage circuitry to store a list comprising a plurality of candidate offset values having a default order, and prefetch circuitry to generate prefetch addresses by modifying a base address using a current offset, and to issue prefetch requests to cause information beginning at a corresponding prefetch address to be prefetched into the storage structure in anticipation of a demand request for that information. The apparatus further comprises prefetch training circuitry to select a new offset from the list of candidate offset values through comparison of the plurality of candidate offset values against data indicative of recent requests. The prefetch training circuitry is configured to identify a subset of the candidate offset values based on the current offset and to dynamically modify the default order to increase priority of the subset.

20 Claims, 9 Drawing Sheets

PREFETCH OFFSET SELECTION

TECHNICAL FIELD

The present invention relates to data processing. More particularly the present invention relates to an apparatus, a method, and a medium for prefetch offset selection.

BACKGROUND

Some apparatuses are provided with prefetch circuitry arranged to issue prefetch requests that trigger the prefetching of data or instructions from more remote storage into storage structures closer to the apparatus in advance of the issuing of a demand request for the data or instructions. This approach helps reduce latency because when the demand request is issued, the data or instructions are already present in the storage structure.

SUMMARY

In some example configurations described herein there is an apparatus comprising:
  candidate offset storage circuitry configured to store a list comprising a plurality of candidate offset values having a default order;
  prefetch circuitry configured to generate prefetch addresses by modifying a base address using a current offset of the plurality of candidate offset values, and to issue prefetch requests, each based on a corresponding one of the prefetch addresses, to cause information beginning at the corresponding prefetch address to be prefetched into the storage structure in anticipation of a demand request for that information being issued to the storage structure; and
  prefetch training circuitry configured to select a new offset from the list of candidate offset values to replace the current offset through a comparison of the plurality of candidate offset values against data indicative of recent requests issued to the storage structure, wherein the prefetch training circuitry is configured to identify a subset of the candidate offset values based on the current offset and to dynamically modify the default order to increase priority of the subset of the candidate offset values which are considered in the comparison.

In some example configurations described herein there is a method of operating an apparatus comprising:
  storing a list comprising a plurality of candidate offset values having a default order;
  generating prefetch addresses by modifying a base address using a current offset of the plurality of candidate offset values, and issuing prefetch requests, each based on a corresponding one of the prefetch addresses, to cause information beginning at the corresponding prefetch address to be prefetched into the storage structure in anticipation of a demand request for that information being issued to the storage structure; and
  selecting a new offset from the list of candidate offset values to replace the current offset through a comparison of the plurality of candidate offset values against data indicative of recent requests issued to the storage structure, wherein the selecting comprises identifying a subset of the candidate offset values based on the current offset and dynamically modifying the default order to increase priority of the subset of the candidate offset values which are considered in the comparison.

In some example configurations described herein there is a non-transitory computer readable storage medium to store computer-readable code for fabrication of an apparatus comprising:
  candidate offset storage circuitry configured to store a list comprising a plurality of candidate offset values having a default order;
  prefetch circuitry configured to generate prefetch addresses by modifying a base address using a current offset of the plurality of candidate offset values, and to issue prefetch requests, each based on a corresponding one of the prefetch addresses, to to cause information beginning at the corresponding prefetch address to be prefetched into the storage structure in anticipation of a demand request for that information being issued to the storage structure; and
  prefetch training circuitry configured to select a new offset from the list of candidate offset values to replace the current offset through a comparison of the plurality of candidate offset values against data indicative of recent requests issued to the storage structure, wherein the prefetch training circuitry is configured to identify a subset of the candidate offset values based on the current offset and to dynamically modify the default order to increase priority of the subset of the candidate offset values which are considered in the comparison.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
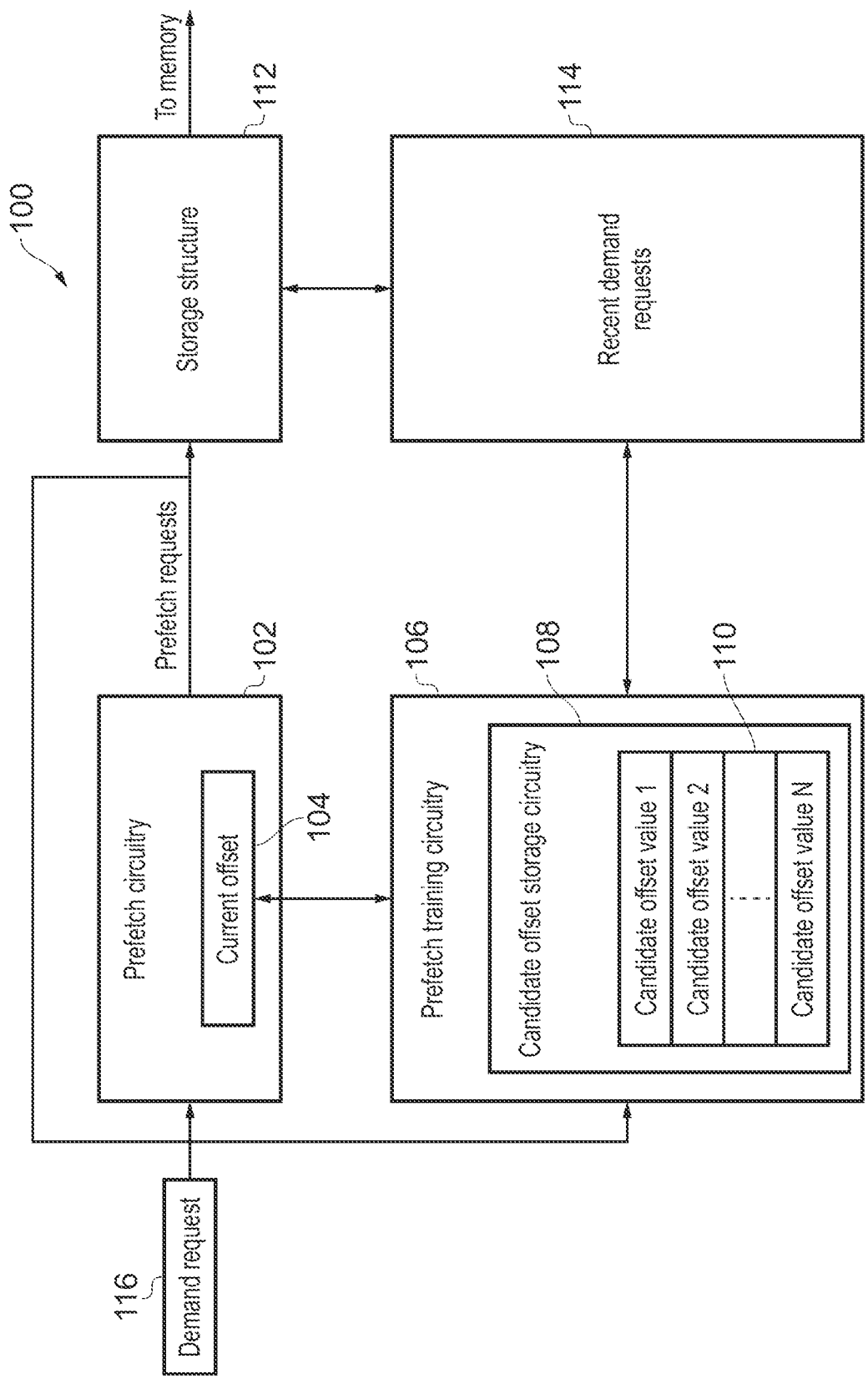
FIG. 1 schematically illustrates an apparatus according to various configurations of the present techniques.

Before discussing the configurations with reference to the accompanying figures, the following description of configurations is provided.

A prefetch request is a request for data or instructions at a time, during program execution, which is in advance of a time point when the data or instructions are expected to be required. In contrast, a demand request is a request for the data or instructions at a time when the data or instructions are required. As such, a timely prefetch request issued in anticipation of a demand request can improve throughput of a processing apparatus because the latency associated with the retrieval of the data or instructions into a storage structure is removed from the critical flow. If a prefetch request is issued too late, it may not result in the data or instructions being returned before the demand request is issued, resulting in a wasted prefetch request. Alternatively, if a prefetch request is issued too far in advance of the demand request, then the retrieved data or instructions may be evicted from the storage structure prior to the receipt of the demand request, potentially causing thrashing.

Where data or instruction accesses are following a simple pattern, for example, with a constant and non-varying offset between sequential accesses, prefetch generation circuitry can be provided that issues prefetch requests following that simple pattern. For example, if a sequence of instructions requires data spaced by N cache lines in memory, then prefetch circuitry issuing prefetch requests identifying, as target data, the address of a current demand request plus an offset equal to an integer multiple of N cache lines could be sufficient to ensure that latency associated with the retrieval of data or instructions remains hidden from the critical path. However, where there is not a simple access pattern for data or instructions, or where the simple access pattern changes due to, for example, varying demands on the processing circuitry, the selection of an appropriate offset for prefetching can become more difficult.

In accordance with one example configuration there is provided an apparatus comprising candidate offset storage circuitry configured to store a list comprising a plurality of candidate offset values having a default order. The apparatus further comprises prefetch circuitry configured to generate prefetch addresses by modifying a base address using a current offset of the plurality of candidate offset values, and to issue prefetch requests, each based on a corresponding one of the prefetch addresses, to cause information beginning at the corresponding prefetch address to be prefetched into the storage structure in anticipation of a demand request for that information being issued to the storage structure. The apparatus is also provided with prefetch training circuitry configured to select a new offset from the list of candidate offset values to replace the current offset through a comparison of the plurality of candidate offset values against data indicative of recent requests (e.g., recent demand requests) issued to the storage structure. The prefetch training circuitry is configured to identify a subset of the candidate offset values based on the current offset and to dynamically modify the default order to increase priority of the subset of the candidate offset values which are considered in the comparison.

The prefetch circuitry, candidate offset storage, and prefetch training circuitry may be provided as distinct blocks of circuitry, each performing their own function. Alternatively, one or more distinct blocks of circuitry could be provided that together performs the functions of the described prefetch circuitry, candidate offset storage, and prefetch training circuitry. The prefetches that are issued (for example, either to trigger data or instructions to be prefetched, or to a storage structure to cause the storage structure to prefetch information beginning at the corresponding prefetch address) by the prefetch circuitry are based on a current offset. The prefetch training circuitry is arranged to monitor recent requests (e.g. recent demand requests) that are issued to the storage structure and, based on the recent requests, to identify a new offset to be used for the generation of prefetch requests in place of the current offset. The new offset is identified from a list comprising a plurality of candidate offset values which are arranged in a default order for sequential consideration as a possible offset value for the new offset. As a result, there can be a delay between a processing apparatus changing its data access pattern and the prefetch circuitry modifying the current offset to retrieve the data or instructions demanded by the changed data access pattern. The length of this delay may also be dependent on a number of possible candidate values in the list of candidate offset values that appear between the current offset and the candidate offset value that would be an appropriate choice for the new candidate offset value.

The inventors have realised that the use of a default order is often not the most efficient way to determine the new offset. For example, when a processing apparatus moves from processing a single stream to multiple streams, a best choice for a new offset may be a lowest common multiple of the offsets required to accurately predict each stream individually. Alternatively, when demand on the data bus increases, the timeliness of prefetches may suffer. As a result, a better choice for a new offset may be an integer multiple of the current offset value. The training circuitry is arranged to take advantage of this by dynamically modifying the default order based on the current offset. In other words, instead of considering the candidate offset values in an order that is determined from the default order (e.g., sequentially in the default order or in groups that are sequentially selected from the list in the default order), the prefetch training circuitry is arranged to determine the subset of candidate offset values based on (i.e., derived from) the current offset value and to dynamically (i.e., during training) modify the order in which those candidate offset values are considered from the default order such that those candidate offset values that are included in the subset are considered sooner and/or more frequently than they would have been the case if the candidate offset values were considered in the original default order. For example, the training circuitry may prioritise the subset of candidate offset values that have a determined mathematical, statistical and/or other predefined relationship with the current offset value or may select the subset of candidate offset values by performing a lookup in one or more lookup tables using the current offset. Advantageously, this allows the prefetch training circuit to select the new candidate offset, on average, more rapidly (within fewer clock cycles or memory accesses) than in a case where the default order is used.

The precise set of candidate offset values that are selected as the subset of the candidate offset values may be variously selected. In some configurations the subset of the candidate offset values comprises one or more offset values of the plurality of candidate offset values that are an integer multiple of the current offset. In other words, where a current offset value is denoted X, the subset of the candidate offset values may comprise one or more candidate offset values taken from the set containing entries N×X where N is any integer greater than 1.

In some configurations the subset of the candidate offset values comprises one or more offset values of the plurality of candidate offset values that when multiplied by an integer are equal to the current offset. In other words, the subset of offset values may comprise one or more integer factors of the current offset value. For example, where the current offset value is denoted X, the subset of the candidate offset values may comprise one or more candidate offset values taken from the set containing entries X/N where N is any integer greater than one and the result X/N is itself an integer.

In some configurations, the subset of the candidate offset values comprises an offset value equal to a smallest addressable offset. For example, where the smallest addressable offset is a cache line, the subset of the candidate offset values comprises an offset equal to one cache line.

In some configurations, the prefetch training circuitry is configured to restrict the subset of the candidate offset values to candidate offset values within a predefined range. Larger offsets are less likely to be timely as there is a greater likelihood that data prefetched into the storage structure as a result of a large offset will be evicted before it can be used. Therefore, by restricting the subset of the candidate offset values there is a greater likelihood of finding a timely offset value to use as the new offset value.

In some configurations the prefetch training circuitry is configured to restrict the subset of the candidate offset values to fewer than a predefined number of candidate offset values. The greater the size of the subset of the candidate offset values, the quicker the training process is able to determine a new offset value. However, increasing the size of the subset also results in an increased circuit and power overhead. Therefore, maintain the size of the subset below the predefined number of candidate offset values results in a compact circuit for determining the offset value.

The prefetch training circuitry may be arranged to consider any portion of the list comprising the candidate offset values when training the prefetch training circuitry. In some configurations the prefetch training circuitry is configured to select the new offset during a training phase in which the candidate offset values are considered in turn. Considering the candidate offset values in turn ensures that even candidate offset values that are considered as less likely candidates (and therefore not prioritised by the prefetch training circuitry) are considered during the training phase. This ensures that the prefetch training circuitry is able to find a new offset value in cases where a pattern of demand requests issued to the storage structure changes, for example, due to completion of a first thread and the starting of another thread which uses a different data access pattern unrelated to the data access pattern of the first thread.

The prefetch circuitry can be provided with sufficient counters to consider each of the candidate offset values during a single phase of training. However, in some configurations the training phase comprises sequential consideration of a plurality of training sub-phases each of which comprises consideration of a corresponding plurality of sub-phase offsets comprising the subset of the candidate offset values and one or more of the plurality of candidate offset values selected based on the default order. By breaking the training phase down into a sequence of sub-phases that are considered sequentially, the prefetch training circuitry can be provided having a reduced circuit footprint. By considering the subset of the candidate offset values in each sub-phase, the training circuitry is able to prioritise candidate offset values that are derived based on the current offset value throughout the training phase.

In some configurations for each of the plurality of training sub-phases, the corresponding plurality of sub-phase offsets comprises the current offset. Hence, in each sub-phase of the training phase, the prefetch training circuitry is arranged to consider the prioritised subset of the candidate offset values, the current offset and at least one of the candidate offset values.

In some configurations the training phase comprises consideration of each of the plurality of sub-phases a single time. In alternative configurations, the training phase comprises repeated consideration of at least one of the sub-phases.

The candidate offset values selected for consideration during a training sub-phase may be considered in any order either sequentially or in parallel. However, in some configurations the training phase comprises, for each of the plurality of training sub-phases, performing a plurality of rounds of training for that sub-phase; and each of the plurality of rounds of training comprises sequentially comparing each of the corresponding plurality of sub-phase offsets for that sub-phase to one of a sequence of current requests to the storage structure. In other words, during a sub-phase, a corresponding plurality of sub-phase offsets is considered. Within one round of the plurality of rounds, the prefetch training circuitry is arranged to sequentially work through each of the corresponding plurality of sub-phase offsets in turn and to compare the currently considered one of the corresponding plurality of sub-phase offsets against a current demand request of a sequence of demand requests that are issued to the storage structure. In some configurations, each of the corresponding plurality of sub-phase offsets is compared against a same current demand request to determine whether or not that one of the corresponding plurality of sub-phase offsets could have predicted the current demand request and, in a next round, each of the subset of the candidate offset values is compared against a next demand request. In other configurations, each of the corresponding plurality of sub-phase offsets is compared against a sequentially next demand request such that each demand request is compared against a different one of the corresponding plurality of sub-phase offsets with a sequentially next demand request being used for comparison against a sequentially next one of the subset of the corresponding plurality of sub-phase offsets.

The inclusion of the prefetch training circuitry is configured to remove duplicate candidate offset values from each of the corresponding plurality of sub-phase offsets. The inclusion of the subset of the candidate offset values in addition to one or more of the plurality of candidate offset values may result in a duplication of candidate offset values within one sub-phase. This may result in an artificial increase in the observed number of occurrences of the duplicated candidate offset values. Therefore, the removal of the duplicated offset values avoids the artificial identification of one of the candidate offset values that may, overall, not be the best choice for a candidate offset value. Furthermore, by removing duplicate values for a particular sub-phase a time and or power cost associated with considering that sub-phase can be reduced.

In some configurations the prefetch training circuitry is configured to maintain a plurality of counters, each corresponding to one of the plurality of candidate offset values, and the training phase comprises: for each of the plurality of candidate offset values, modifying a counter of the plurality of counters corresponding to that candidate offset value in response to a determination that the data indicative of recent requests indicates that an address difference between one of a current request and one of the recent requests is equal to that candidate offset value; and selecting as the new offset, the candidate offset value corresponding to one of the plurality of counters indicating a highest frequency of occurrence of that candidate offset value. The plurality of counters may be provided as one counter per one of the plurality of candidate offset values. Alternatively, the plurality of counters may be provided as one counter for each one of the corresponding plurality of sub-phase offsets considered in a given sub-phase such that, during the given sub-phase, each of the plurality of counters is assigned to one of the plurality of candidate offset values that is represented in the corresponding plurality of sub-phase offsets. Independently of how many individual counters are provided, the counters are used to represent a number of accesses that could have been predicted by the candidate offset value that corresponds to that counter. Hence, during the training phase the new offset can be selected as the offset value corresponding to a counter having a highest value. The counters can be provided as incrementing counters with a highest value indicating the highest frequency of occurrences of as decrementing counters with a lowest value indicating the highest frequency of occurrences. Alternatively, configurations of counters could be provided in which the frequency of occurrences can be determined based on a difference between the counters and a corresponding base value.

Whilst the value by which the counter is modified can be constant and dependent only on whether the candidate offset value could have been used to prefetch that data, in some configurations the data indicative of recent requests comprises, for each of the recent requests, a timeliness hint indicator configured to indicate that requested data is timely when the requested data indicated in that recent request was already present in the storage structure on receipt of a corresponding demand request for the requested data; the training phase comprises, for each of the plurality of candidate offset values and when modifying the counter corresponding to that candidate offset value: modifying the counter by a first value in response to the determination when the timeliness hint indicator indicates that the requested data is not timely; and modifying the counter by a second value, greater in magnitude than the first value, in response to the determination when the timeliness hint indicator indicates that the requested data is timely. In other words, data which would have been prefetched in a timely manner (data which, if prefetched in response to an earlier demand request, would already be present in the storage structure at the time of the current demand request) is considered to be more indicative of a suitable candidate for the new offset value that data which would have been prefetched but not in a timely manner. The first value and second value can be any value by which the counter can be modified. For example, the first value could be +1 and the second value could be +2. Alternatively, if a decrementing counter was provided, the first counter could be a value of −1 and the second value could be −2. It would be readily apparent to the person having ordinary skill in the art that the values of +/−1 and +/−2 are provided for exemplary purposes any other values could be used for the first value and the second value.

The techniques described herein will generally result in a uniquely defined new offset value as the offset value of the corresponding plurality of sub-phase offsets that has the greatest frequency of occurrences. However, in some configurations the prefetch training circuitry is responsive to identification of two or more candidate offset values having a same corresponding counter value to select, as the new offset, a candidate offset value of the two or more candidate offset values having a lowest magnitude. Where two or more candidate offset values having a same (highest) frequency of occurrences (as identified by the two or more candidate offset values having a same corresponding counter value), the prefetch training circuitry is configured to select the offset value having a lowest magnitude. For some access patterns there will be multiple possible offset values that would result in timely prefetching. For example, if the minimum addressable offset was a single cache line, and a sufficiently long sequence of demand requests are issued for data having an offset of a single cache line, then an offset of any positive integer could be used to prefetch the data. However, if too small an offset is used, the prefetches would not be timely resulting in a lower counter value for that offset. Similarly, if too large an offset is used then memory thrashing may result. However, by picking the smallest offset value of the two or more candidate offset values having a same corresponding counter value the prefetch training circuitry is able to select the smallest timely offset, thereby reducing the likelihood of thrashing whilst ensuring that the offset results in timely prefetches.

The data indicative of recent requests may be derived based on current data stored in the cache. Alternatively, in some configurations the apparatus comprises recent request storage to store the data indicative of recent requests, wherein the comparison of the plurality of candidate offset values against the data indicative of recent requests comprises performing a lookup in the recent request storage. The recent request storage may be comprised within any of the circuitry blocks of the apparatus or may be comprised in a distinct and physically separate storage block. The data indicative of recent requests may be stored as a recent storage table arranged to comprise a list of addresses requested in response to issued demand requests and an indication as to whether those accesses whether data from those addresses has been returned to the cache in response to the demand requests, i.e., whether the data is timely.

The storage structure may be any structure that is suitable for storing data. In some configurations the storage structure is a cache. The cache may be a data cache or an instruction cache. In alternative configurations, the storage structure may be an off-chip memory structure, for example, DRAM.

In some configurations the candidate offset values comprise positive offset values and negative offset values. As a result, the current offset may be a positive offset value or a negative offset value. Independent as to the sign (positive or negative) of the current offset value, the subset of the candidate offset values that are prioritised may be derived based on the current offset value using any of the techniques described hereinabove.

Whilst the techniques described herein may directly be incorporated in an apparatus, and/or be used to control one or more processes performed by such an apparatus, the concepts described herein may additionally, or alternatively, be embodied in computer-readable code for fabrication of an apparatus that embodies the described concepts. For example, the computer-readable code can be used at one or more stages of a design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL.

Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively, or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular configurations will now be described with reference to the figures.

FIG. 1 schematically illustrates an apparatus 100 according to various configurations of the present techniques. The apparatus 100 is provided with prefetch circuitry 102, and prefetch training circuitry 106. The prefetch circuitry 102 is arranged to issue prefetch requests to a storage structure 112, for example, a cache. The storage structure 112 is responsive to prefetch requests for data items from the prefetch circuitry 102 and to demand requests 116 for data items issued by processing circuitry (not shown). The storage structure 112 is responsive to the receipt of the prefetch requests to determine if the data items requested in that prefetch request are already present in the storage structure and, if not, to issue a memory access request to memory to retrieve the data items. The storage structure 112 is responsive to the demand request 116 to determine if the data items requested in that demand request are already present in the storage structure (for example, due to being retrieved from memory by an earlier prefetch request or an earlier demand request) and, if so, to return the data item to the processing circuitry. On the other hand, if the storage structure 112 determines that the data items requested in the demand request 116 are not present in the storage structure, then the storage structure 112 is arranged to issue a memory access request to memory to retrieve the data items. As demand requests 116 are issued at a time when the data items are required by the processing circuitry, and it can take time for requests issued to memory to be returned by the memory, demand requests 116 for which the data item is not already present in the storage structure 112 can result in increased latency. To mitigate this problem, the prefetch circuitry 102 is arranged to make predictions regarding the data items that will be subject to demand requests 116 and to issue prefetch requests for those data items to the storage structure 112 in advance of the demand request 116 for those data items. Whilst only a single instance of prefetch circuitry 102 has been illustrated, the apparatus may be provided with plural instances of prefetch circuitry each provided with circuitry implementing a different prefetch method.

The prefetch circuitry 102 is an offset prefetcher that issues prefetches for data items that are located at a base address (for example, an address identified in a current demand request 116) modified (incremented) by a current offset 104 stored in the prefetch circuitry 102. In order to maintain a current offset 104 that provides an accurate estimate for generating prefetch requests that will be both useful (that will return data required in a future demand request 116) and timely (issued sufficiently in advance of a demand request 116 for the same data item that the same data item has already been returned to the storage structure), the apparatus 100 is provided with prefetch training circuitry 106. The prefetch training circuitry is provided with candidate offset storage circuitry 108 arranged to store a list 110 of a plurality of candidate offset values. In the illustrated configuration, the candidate offset storage circuitry 108 stores a list 110 having candidate offset values 1 through to N. The list 110 of candidate offset values may be hardwired into the candidate offset storage circuitry 108 or may be software visible such that a programmer can modify the list 110 of candidate offset values. The prefetch training circuitry 106 is arranged to maintain and/or update the current offset 104 with a new offset value selected from the list 110 of candidate offset values. The prefetch training circuitry 106 does this by monitoring received demand requests 116 and determining if those demand requests 116 would have been predicted if the current offset value 104 had been set to a chosen one or more candidate offset values from the list 110 of candidate offset values. In order to do this, the apparatus 100 stores information indicative of recent demand requests 114 issued to the storage structure 112. Hence, when a current demand request 116 is received by the prefetch training circuitry 106, the prefetch training circuitry 106 determines the preceding address that would have had to have been identified by a preceding demand request 116 by subtracting a currently considered candidate offset storage value from the current demand request and performing a lookup in the information indicative of recent demand requests 114 to determine if the preceding address is identified therein. If so, then the prefetch training circuitry infers that if, at the time of the previous demand request, a prefetch had been issued with the candidate offset value that is currently being considered by the prefetch training circuitry, then the current demand request would have been prefetched into the storage structure. By maintaining this information over a plurality of demand requests then the prefetch training circuitry 106 is able to identify a new candidate offset value to replace the current offset 104.

Rather than considering the candidate offset values in the default order in which they are present in the list 110 stored in the candidate offset storage 108, the prefetch training circuitry 106 is arranged to determine a subset of the candidate offset values based on the current offset value 104. The subset of candidate offset values may include any candidate offset values that have a predefined relationship with the current offset value. The predefined relationship may be any mathematical or statistical relationship or may be based on performing a lookup in one or more lookup tables (not illustrated). The prefetch training circuitry 106 is arranged to prioritise these candidate offset values, for example, by considering them with a higher frequency than they would occur if the list 110 of candidate offset values was considered in the default order or considering them out of turn with when they would occur if the list 110 of candidate offset values was considered in the default order. In this way the prefetch training circuitry 106 is better adapted to determine a current offset 104 when a sequence of program instructions considered by processing circuitry (not shown) is changed such that a previous data access pattern is modified, for example, by the processing circuitry beginning processing on a new thread of instructions in addition to a current thread of instructions.

Figure 2:
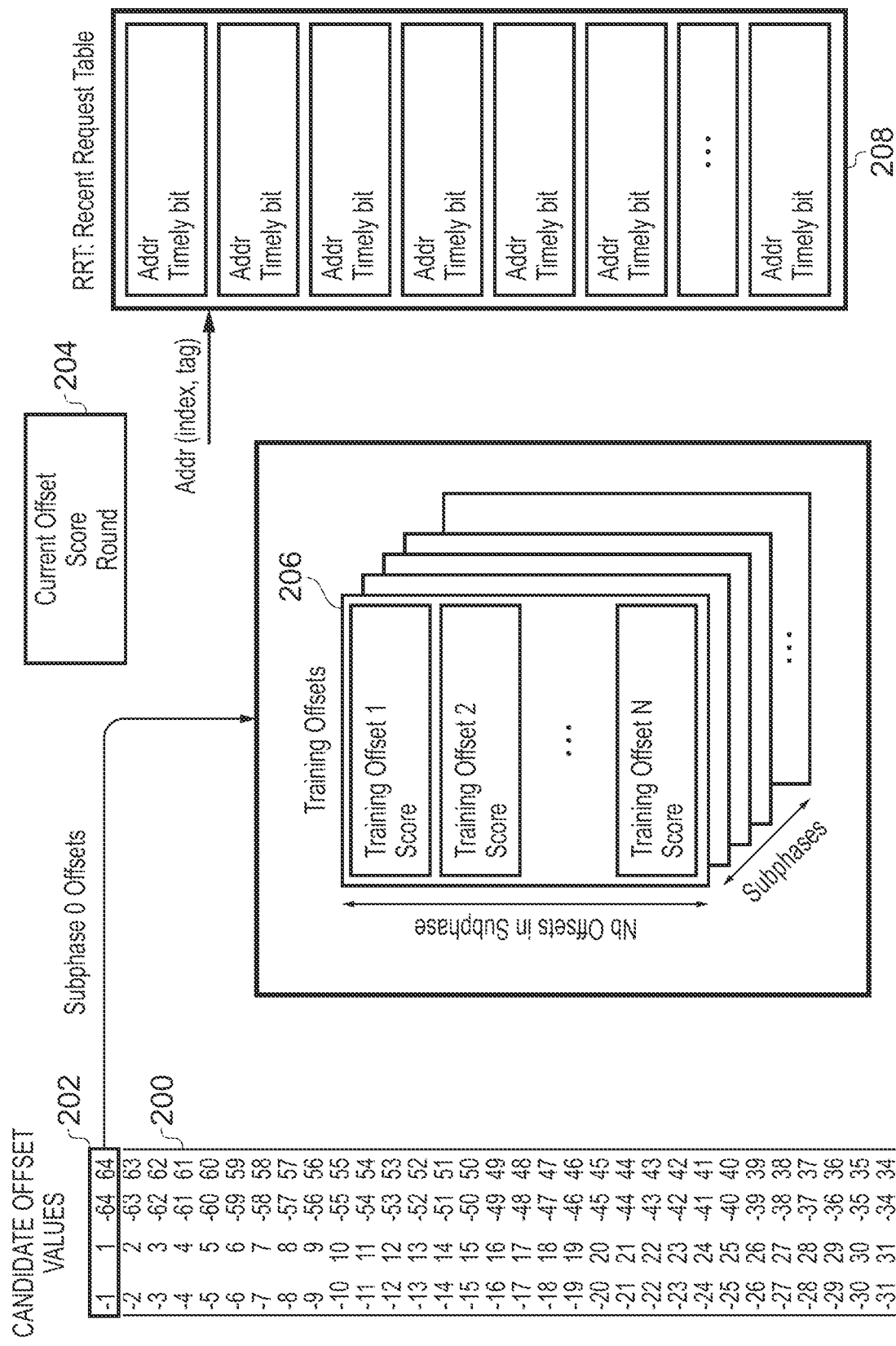
FIG. 2 schematically illustrates training of prefetch circuitry.

FIG. 2 schematically illustrates the training carried out by the prefetch training circuitry 106 according to various configurations of the present techniques. The prefetch training circuitry 106 stores a list 110 of candidate offset values 200 which are used in a training phase to determine a new offset to replace a current offset 204. The prefetch training circuitry 106 breaks the training phase into a series of sub-phases 206. In each of the sub-phases 206, a subset 202 of training offsets is considered. In the illustrated configuration, the candidate offset values 200 are grouped into groups of four and contain both positive and negative candidate offset values ranging in magnitude from 1 to 64 (i.e., including integer values from −1 down to −64 and from 1 up to 64). In each of the sub-phases 206, a group of four candidate offset values, for example, the group 202 are considered by the prefetch training circuitry 106 in addition to the current offset 204. The training phase comprises working in turn through a plurality of sub-phases each of which considers a different group of candidate offset values. In each training phase the prefetch training circuitry 106 is arranged to consider each of the candidate offset values for that phase and the current offset 204 and to maintain a score indicative of how frequently those candidate offset values and the current offset 204 would have successfully predicted a current demand request. The prefetch training circuitry 106 is arranged to do this through comparison of a current demand request, with an address modified based on one of the candidate offset values for the current sub-phase or the current offset, to data indicative of recent requests stored in a recent request table (data indicative of recent requests) 208.

The recent request table 208 stores addresses of recent demand requests and a corresponding timely bit. The timely bit indicates whether that address would have timely predicted the current access. When a demand request is first entered in the recent request table 208, the timely bit is clear. The timely bit is set for the entry of the recent request table 208 when the data item associated with that demand request is returned to the storage structure 112. Hence, the timely bit associated with a demand request in the recent request table 208 is indicative of whether a data request that was issued in response to that request would have been timely retrieved at the point of the current demand request. Whilst the latency associated with prefetching the data items indicated in the current demand request may not be identical to the latency associated with the demand request in the recent request table, this approach provides a means to approximate whether a prefetch request issued at the time of the previous demand request would have likely been timely. By working through the sub-phase each of the candidate offset values 202 can be associated with a score and a new offset to replace the current offset can be selected based on those scores. In some configurations, a new offset is chosen to replace the current offset after each sub-phase.

Figure 3:
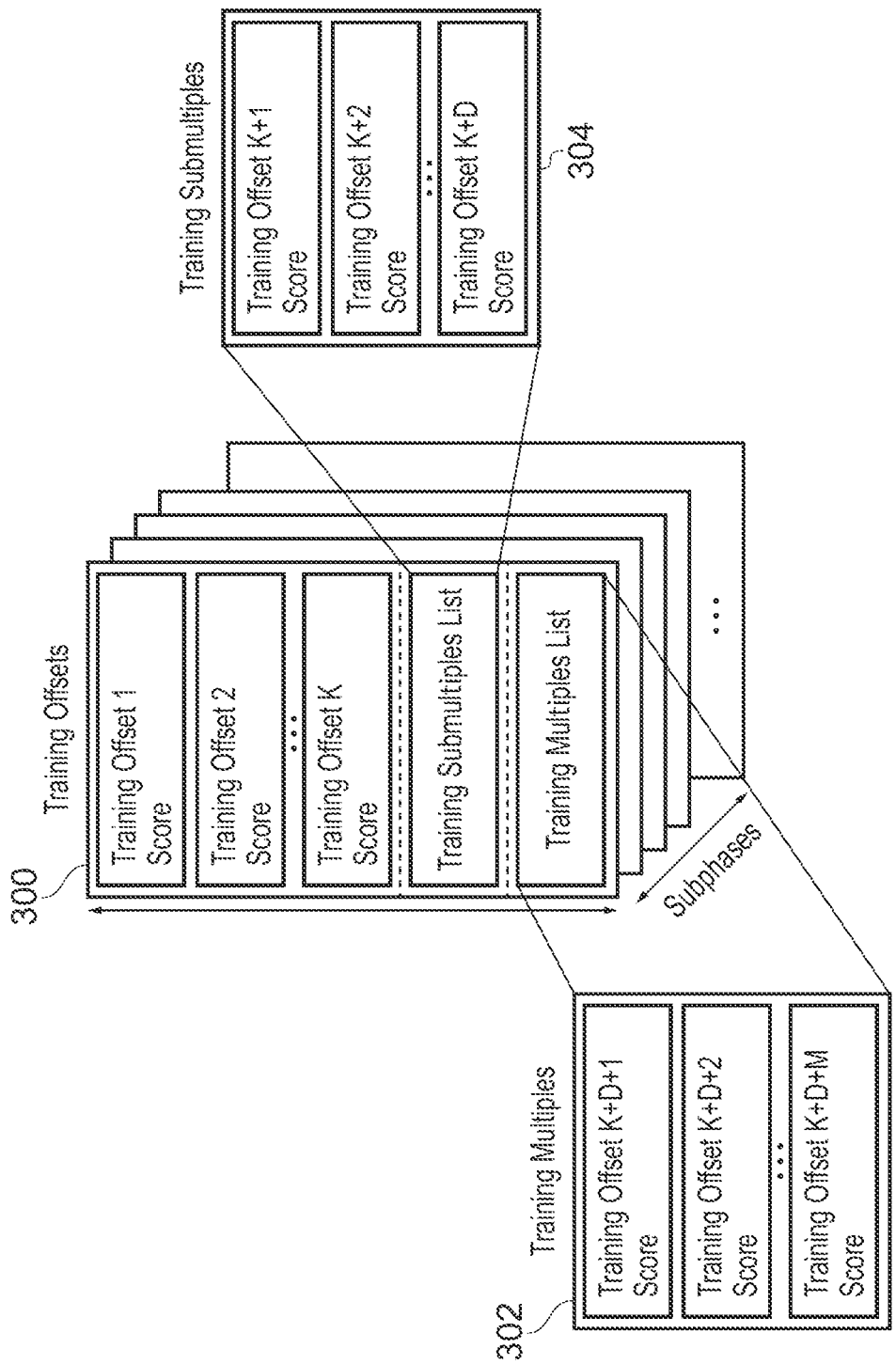
FIG. 3 schematically illustrates training of prefetch circuitry according to various configurations of the present techniques.

FIG. 3 schematically illustrates an example of the candidate offset values that are considered in a sub-phase 300 of the training phase. The sub-phase 300 comprises a set of training offset values including training offset 1 through to training offset K that are selected from the list 110 of candidate offset values. The sub-phase 300 also comprises a set of training multiples 302. These are values that are derived as integer multiples of the current offset value. For example, if the current offset value is X, the training multiples may comprise 2×X, 3×X, 4×X, etc. The sub-phase 300 also comprises a set of training sub-multiples 304. These are integer training offsets that satisfy the condition of being equal to the current offset when multiplied by an integer. In other words, the training submultiples 304 are factors of the current offset. Each training phase 300 comprises training offsets that are selected from a different portion of the list 110 and the training multiples 302 and training submultiples 304 which are each calculated based on the current offset at the start of that training sub-phase. For example, if the current offset is replaced with a new offset having a different value at the end of a preceding sub-phase, then the training multiples 302 and the training submultiples 304 are each recalculated, based on the new offset value that has replaced the previous offset value as the current offset value, at the beginning of the current training sub-phase.

Figure 4:
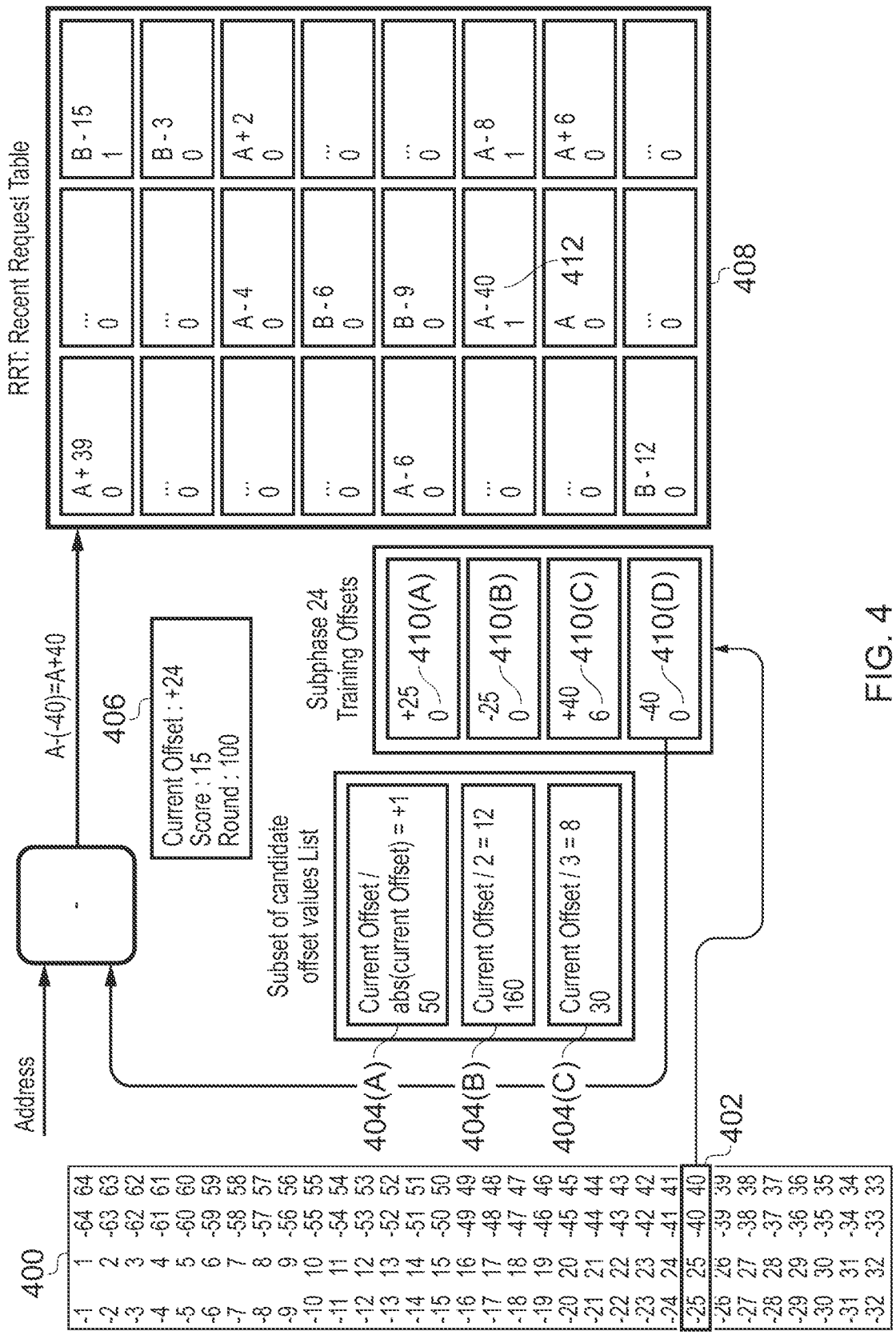
FIG. 4 schematically illustrates a training sub-phase according to various configurations of the present techniques.
Figure 5:
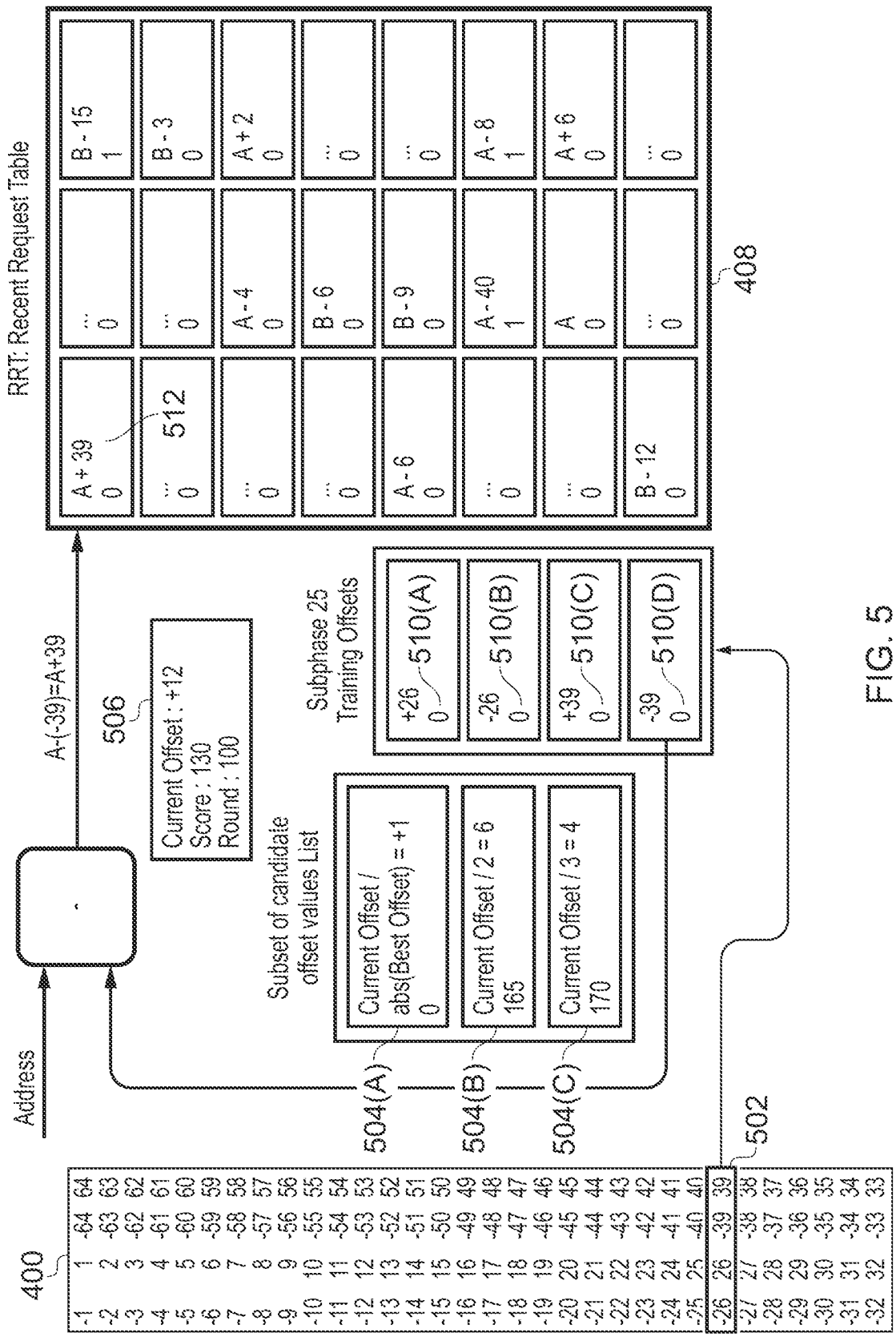
FIG. 5 schematically illustrates a training sub-phase according to various configurations of the present techniques.
Figure 6:
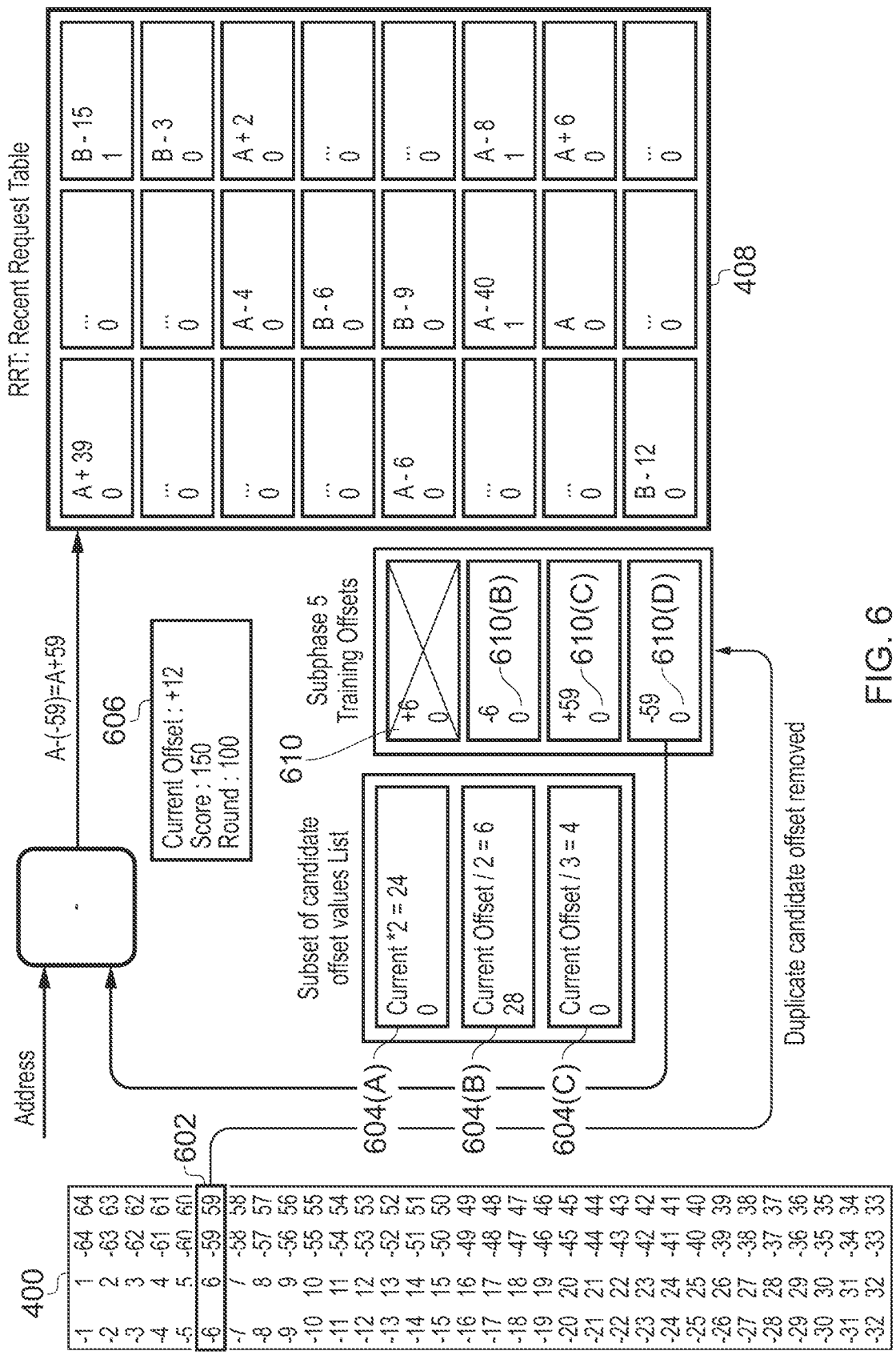
FIG. 6 schematically illustrates a training sub-phase according to various configurations of the present techniques.

As discussed, each of the training sub-phases may be considered in a number of different rounds. In each round, each of the candidate offset values associated with that sub-phase are considered. FIGS. 4-6 schematically illustrate examples of the behaviour of the prefetch training circuitry 106 during one round of the training phase. FIG. 4 schematically illustrates a first example of a round of a training sub-phase. In the illustrated example, a list of candidate offset values 400 is provided. During the illustrated training sub-phase candidate offset values 402 of −25, 25, −40, and 40 are selected from the list of candidate offset values 400.

A counter 410 is assigned to each of the candidate offset values 402. In particular, a first counter 410(A) is assigned to the candidate offset value of 25, a second counter 410(B) is assigned to the candidate offset value of −25, a third counter 410(C) is assigned to the candidate offset value of 40, and a fourth counter 410(D) is assigned to the candidate offset value of −40. In the illustrated example, the current offset value 406 is +24 and a subset of candidate offset values 404 are determined based on the current offset value 406. In particular, a first offset value 404(A) of the subset of candidate offset values is derived from the current offset 406 as the current offset/the absolute value of the current offset, i.e., the first offset value 404(A) is equal to +1; a second offset value 404(A) is derived as the current offset 406 divided by 2, i.e., the second offset value 404(A) is equal to 12; and a third offset value 404(C) is derived from the current offset value as the current offset 406 divided by 3, i.e., the third offset value 404(C) is equal to 8.

Each of the candidate offset values 402 and the subset of candidate offset values 404 derived from the current offset 406 are considered in the sub-phase along with the current offset value 406. Within the sub-phase a plurality of rounds is considered. In the illustrated example, 100 rounds are considered in a sub-phase. During each round, each of the subset of candidate offsets, 404 the candidate offset values 402 and the current offset 406 are compared, in turn, against an address of a current demand address. In particular, the offset that is currently being compared is subtracted from the address that is associated with the current demand address and the resulting address is looked up in the recent request table 408. In the illustrated example, the candidate offset value 402 of −40 is subtracted from the address A to result in an address of A−(−40)=A+40 which is compared against the addresses stored in the recent request table 408. As there is no address of A+40 in the recent request table, the score associated with the candidate offset value 402 of −40 is not modified. On the other hand, had the candidate offset value 402 of +40 been considered against the address, then the address looked up in the recent request table 408 would have been A−(+40)=A−40 which is present and timely 412 and would have resulted in the score 410(C) being incremented.

Within a single round, this process is repeated for each of the candidate offset values 410, the subset of candidate offset values 404 and the current offset 406. After a number of rounds (100 in the illustrated example) the score for the current offset 406 is 15, the score associated with the candidate offset value 404(A) is 50, the score associated with the candidate offset value 404(B) is 160, the score associated with the candidate offset value 404(C) is 30, the score 410(C) associated with the candidate offset value 402 of +40 is 6, and the score associated with each of the other candidate offset values 402 is zero. As a result, the candidate offset value 404(B) having a value of 12 is selected as the new offset to replace the current offset value 406.

FIG. 5 schematically illustrates an end result of a sequentially next sub-phase occurring after the sub-phase illustrated in FIG. 4. Because, in FIG. 4, the candidate offset value 404(B) was selected as the new offset value, the current offset value 506 in the sub-phase illustrated in FIG. 5 is +12. The list of candidate offset values 400 is unchanged in this sub-phase. However, the candidate offset values 502 selected for consideration from the list of candidate offset values 400 is modified to consider the candidate offset values 502 that occur next in the default order of the list of candidate offset values (moving from top to bottom of the list). The candidate offset values 502 that are considered in this sub-phase are −26, 26, −39, and 39.

A counter 510 is assigned to each of the candidate offset values 502. In particular, a first counter 510(A) is assigned to the candidate offset value of 26, a second counter 510(B) is assigned to the candidate offset value of −26, a third counter 510(C) is assigned to the candidate offset value of 39, and a fourth counter 510(D) is assigned to the candidate offset value of −39. In the illustrated example, the current offset value 506 is +12 and a subset of candidate offset values 504 are determined based on the current offset value 506. In particular, a first offset value 504(A) of the subset of candidate offset values is derived from the current offset 506 as the current offset/the absolute value of the current offset, i.e., the first offset value 504(A) is equal to +1; a second offset value 504(A) is derived as the current offset 406 divided by 2, i.e., the second offset value 504(A) is equal to 6; and a third offset value 504(C) is derived from the current offset value as the current offset 506 divided by 3, i.e., the third offset value 404(C) is equal to 4.

Each of the candidate offset values 502 and the subset of candidate offset values 504 derived from the current offset 506 are considered in the sub-phase along with the current offset value 506. Within the sub-phase a plurality of rounds is considered. In the illustrated example, 100 rounds are considered in a sub-phase. During each round, each of the subset of candidate offsets, 504 the candidate offset values 502 and the current offset 506 are compared, in turn, against an address of a current demand address. In particular, the offset that is currently being compared is subtracted from the address that is associated with the current demand address and the resulting address is looked up in the recent request table 508. In the illustrated example, the candidate offset value 402 of −39 is subtracted from the address A to result in an address of A−(−39)=A+39 which is compared against the addresses stored in the recent request table 408. As address of A+39 is stored 512 in the recent request table 408 but the address A+39 is not timely, the score associated with the candidate offset value 402 of −39 is modified to indicate that the current demand request would have been predicted but would not have been timely.

Within a single round, this process is repeated for each of the candidate offset values 510, the subset of candidate offset values 504 and the current offset 506. After a number of rounds (100 in the illustrated example) the score for the current offset 506 is 130, the score associated with the candidate offset value 504(A) is 0, the score associated with the candidate offset value 504(B) is 165, the score associated with the candidate offset value 504(C) is 170, the scores 510 associated with each of the candidate offset values 402 is zero. As a result, the candidate offset value 504(C) having a value of 4 is selected as the new offset to replace the current offset value 506.

FIG. 6 schematically illustrates an example result of a further training sub-phase. In the illustrated example, the current offset 606 is 12 and the subset of candidate offset values 604 that are derived from the current offset 606 are a first value 604(A) having a value equal to the current offset 606 multiplied by 2, i.e., the first value 604(A) is equal to 24; a second value 604(B) equal to the current offset 606 divided by 2, i.e., the second value 604(B) is equal to 12; and a third value 604(C) equal to the current offset 606 divided by 3, i.e., the third value 604(C) is equal to 4. In the illustrated example the list of offset values 400 is identical to the list of offset values provided in FIGS. 4 and 5. However, the candidate offset values 602 selected from the list of candidate offset values 606 are offset values of −6, 6, −59, and 59.

As a result, the candidate offset values that are considered in the illustrated sub-phase comprises a duplicated offset value. In particular, the offset value of 6 is present as one of the candidate offset values 602 selected from the list of candidate offset values 400 and in the subset of candidate offset values 604 as the current offset 606 divided by 2. The prefetch training circuitry 106 is arranged to recognise the presence of a duplicate value 610 and is responsive to such a recognition to remove one instance of the duplicate value. As a result, the candidate offset values considered in the illustrated sub-phase comprises one fewer candidate offset values than the examples set out in FIGS. 4 and 5.

As in FIGS. 4 and 5, the candidate offset values 602 with the duplicate value 610 removed, the subset of candidate offset values 604 and the current offset 606 are each compared against a sequence of demand requests each specifying an address to see if those offset values would have predicted that demand access based on a recent request stored in the recent request table 408. The details of the comparisons are set out in relation to FIGS. 4 and 5 and will not be repeated here for reasons of conciseness.

After a number of rounds (100 in the illustrated example) the score for the current offset 606 is 150, the score associated with the candidate offset value 604(A) is 0, the score associated with the candidate offset value 604(B) is 28, the score associated with the candidate offset value 504(C) is 0, the scores 510 associated with each of the candidate offset values 402 is zero. As a result, the current offset value 606 has the highest score and is retained as the current offset. In some configurations retaining the current offset comprises identifying that the new offset takes a same value as the current offset 606 and the current offset 606 is replaced with a new offset having a same value as the current offset. In other configurations, the prefetch training circuitry is responsive to the identification of the current offset value as an appropriate candidate for the new offset value to skip the step of replacing the current offset value.

Figure 7:
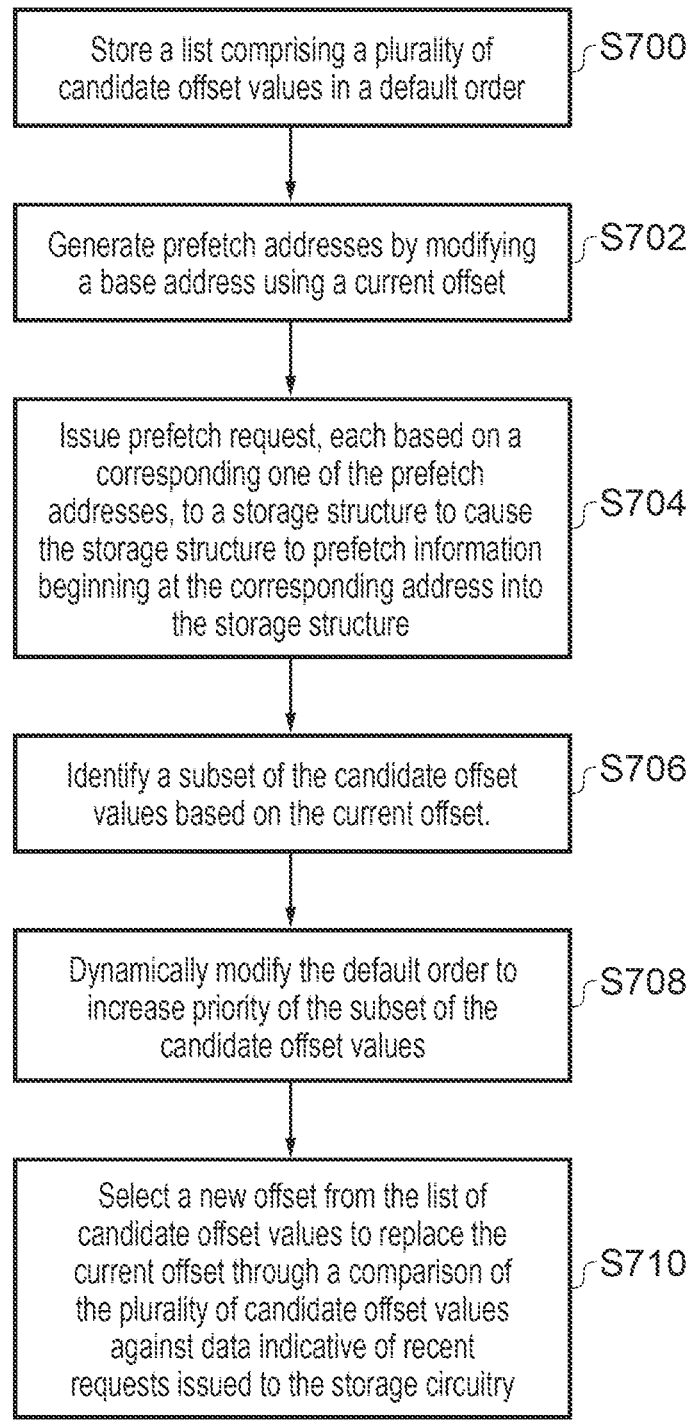
FIG. 7 schematically illustrates a sequence of steps carried out by prefetch training circuitry according to various configurations of the present techniques.

FIG. 7 schematically illustrates a sequence of steps carried out by an apparatus according to various examples of the present techniques. Flow begins at step S700 where a list comprising a plurality of candidate offset values having a default order is stored. Flow then proceeds to step S702 where prefetch addresses are generated by modifying a base address (for example, provided in a demand request) using a current offset. Flow then proceeds to step S704 where prefetch requests are issued, each based on a corresponding one of the prefetch addresses (generated in step S702), to a storage structure to cause the storage structure to prefetch information beginning at the corresponding address into the storage structure. Flow then proceeds to step S706 where a subset of the candidate offset values are identified based on the current offset. Flow then proceeds to step S708 where the default order in which the plurality of candidate offset values are stored is modified in order to increase the priority of the subset of the candidate offset values. Flow then proceeds to step S710 where a new offset is selected from the list of candidate offset values to replace the current offset through a comparison of the plurality of candidate offset values against data indicative of recent requests issued to the storage circuitry.

Figure 8:
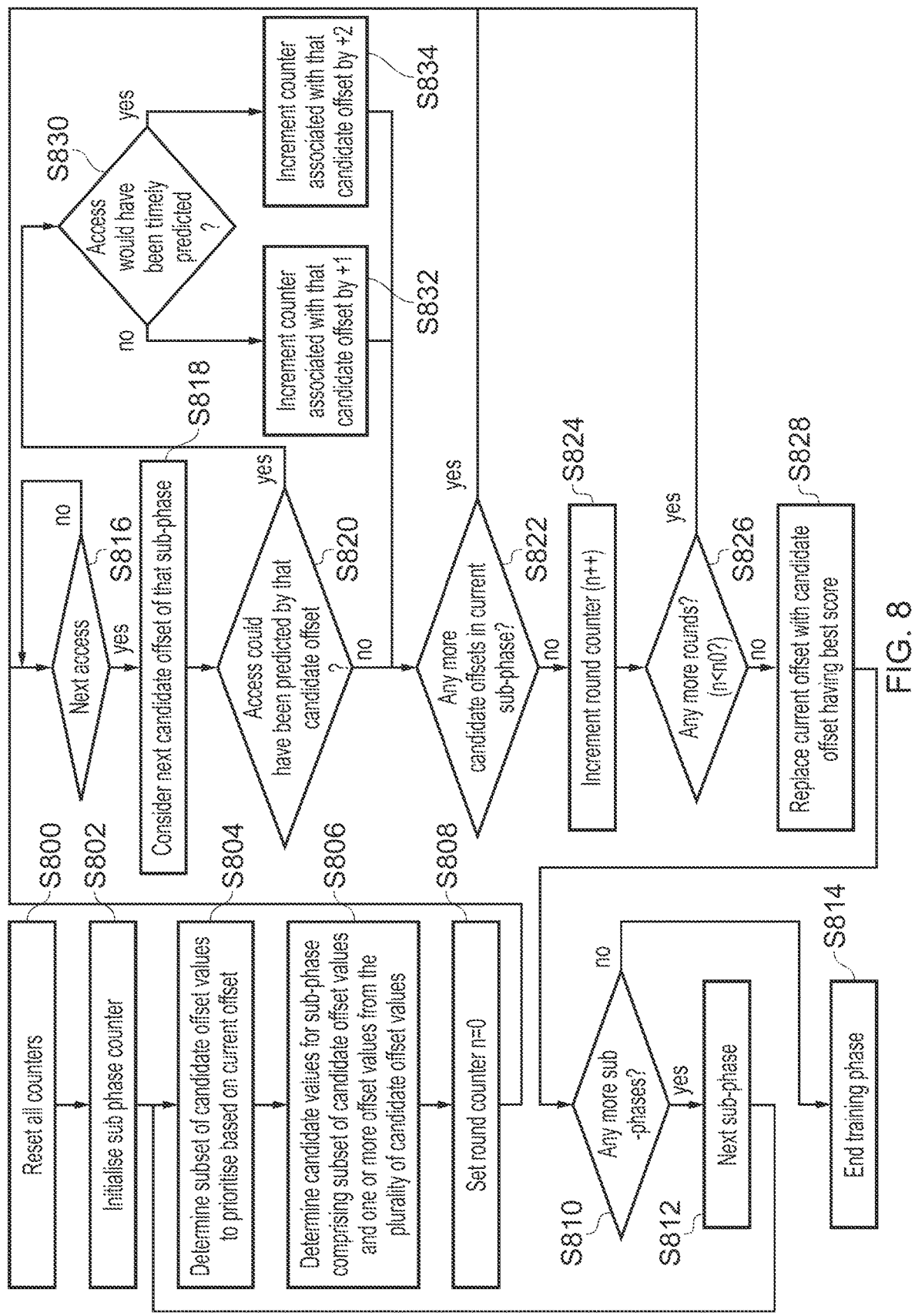
FIG. 8 schematically illustrates a sequence of steps carried out by prefetch training circuitry according to various configurations of the present techniques.

FIG. 8 schematically illustrates a sequence of steps carried out by the prefetch training circuitry according to various examples of the present techniques. Flow begins at step S800 where all counters associated with the training phase are reset. Flow then proceeds to step S802 where a set of sub-phase counters associated with a current sub-phase of the training phase are initialised (set to 0). Flow then proceeds to step S804 where a subset of the candidate offset values to prioritise are determined based on a current offset. Flow then proceeds to step S806 where the candidate values to be considered in a current sub-phase are determined. The candidate values for the current sub-phase comprises the subset of the candidate offset values (determined at step S804), one or more offset values taken in the default order from the plurality of candidate offset values and the current offset value. Flow then proceeds to step S808 where the round counter is set to zero (n=0).

Flow then proceeds to step S816 where it is determined whether or not a next access has taken place. If, at step S816, it is determined that no next access has taken place, then flow remains at step S816. If, at step S816, it is determined that a next access has taken place then flow proceeds to step S818 where a next candidate offset of the current sub-phase is considered. Flow then proceeds to step S820 where it is determined if the access could have been predicted by that candidate offset. This is determined through comparison to a data indicative of recent demand requests that are issued to the cache. If, at step S820, it is determined that the access could not have been predicted by that candidate offset, then flow proceeds to step S822. If, at step S820, it is determined that the access could have been predicted by that candidate offset, then flow proceeds to step S830 where it is determined if the access would have been timely predicted, i.e., if the prediction would have been made in sufficient time for the data requested by the demand request to be returned to the cache. This is determined from a timely bit indicated in the data indicative of recent accesses. If, at step S830, it is determined that the access would not have been timely, then flow proceeds to step S832 where a counter associated with that candidate offset is incremented by a first value (e.g., +1) before flow proceeds to step S822. If, at step S830, it was determined that the access would have been timely, then flow proceeds to step S834 where the counter associated with that candidate offset is incremented by a second value that is greater than the first value (e.g., +2) before flow proceeds to step S822. At step S822, it is determined whether there are any more candidate offsets in the current sub-phase. If, at step S822, it was determined that there were more candidate offsets in the current sub-phase then flow returns to step S816. If, at step S822, it was determined that there are not any more candidate offsets in the current sub-phase then flow proceeds to step S824 where the round counter n is incremented (n++). Flow then proceeds to step S826 where it is determined if there are any more rounds to be considered in the current sub-phase. If, at step S826, it is determined that there are more rounds to be considered in the current sub-phase, then flow returns to step S816. If, at step S826, it is determined that there are no more rounds to be considered at the current sub-phase, then flow proceeds to step S828. At step S828, the current offset is replaced with a candidate offset having a best score. It is noted that the candidate offset having the best score may be the current offset. Flow then proceeds to step S810, where it is determined if there are any more sub-phase in the current training round. If, at step S810, it is determined that there are more sub-phases, then flow proceeds to step S812, where the next sub-phase is selected before flow returns to step S802. If, at step S810, it was determined that there are no more sub-phases, then flow proceeds to step S814 where the training phase completes.

Figure 9:
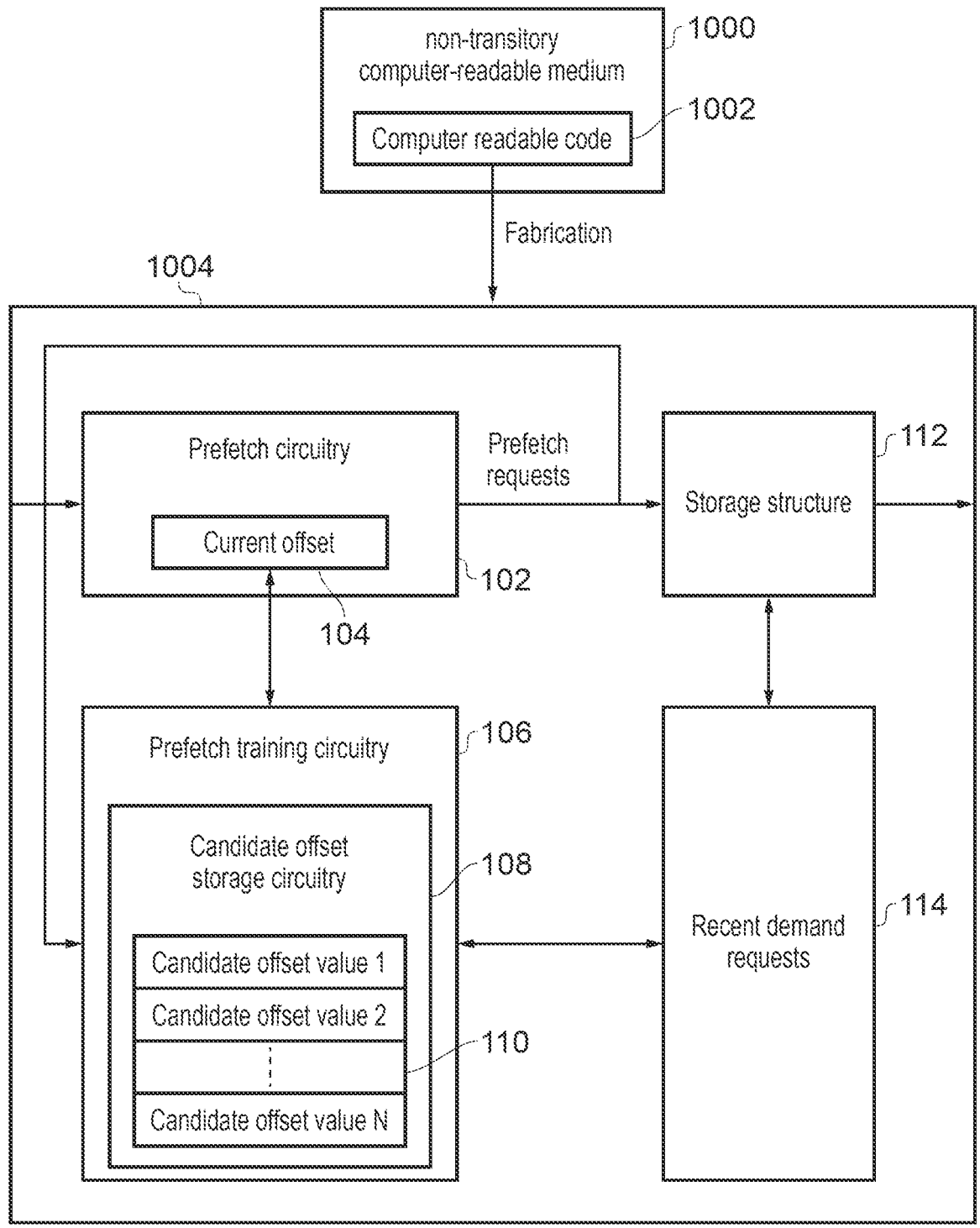
FIG. 9 schematically illustrates a computer-readable medium storing computer readable code for fabrication of an apparatus according to various configurations of the present techniques.

FIG. 9 schematically illustrates a non-transitory computer-readable medium comprising computer readable code for fabrication of an apparatus according to various configurations of the present techniques. Fabrication is carried out based on computer readable code 1002 that is stored on a non-transitory computer-readable medium 1000. The computer-readable code can be used at one or more stages of a semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as a field programmable gate array (FPGA) to configure the FPGA to embody the configurations described hereinabove or to facilitate the fabrication of an apparatus implemented as one or more integrated circuits or otherwise that embody the configurations described hereinabove. The fabricated design 1004 may in one example implementation comprise the prefetch circuitry 102, the prefetch training circuitry 106, the storage structure 112 and the information indicative of the recent demand requests as described in FIG. 1. Alternatively, the fabricated design 1004 may comprise only the prefetch circuitry 102 and the prefetch training circuitry 106 illustrated in FIG. 1 and arranged to interact with a storage structure 112 and information indicative of recent demand requests 114 which may be derived from and/or stored in structures not incorporated in the fabricated design.

In brief overall summary there is provided an apparatus, medium and method. The apparatus comprises candidate offset storage circuitry to store a list comprising a plurality of candidate offset values having a default order, and prefetch circuitry to generate prefetch addresses by modifying a base address using a current offset, and to issue prefetch requests to cause information beginning at a corresponding prefetch address to be prefetched into the storage structure in anticipation of a demand request for that information. The apparatus further comprises prefetch training circuitry to select a new offset from the list of candidate offset values through comparison of the plurality of candidate offset values against data indicative of recent requests. The prefetch training circuitry is configured to identify a subset of the candidate offset values based on the current offset and to dynamically modify the default order to increase priority of the subset.

Some example configurations are set out in the following clauses:

Clause 1. An apparatus comprising:
candidate offset storage circuitry configured to store a list comprising a plurality of candidate offset values having a default order;
prefetch circuitry configured to generate prefetch addresses by modifying a base address using a current offset of the plurality of candidate offset values, and to issue prefetch requests, each based on a corresponding one of the prefetch addresses, to cause information beginning at the corresponding prefetch address to be prefetched into the storage structure in anticipation of a demand request for that information being issued to the storage structure; and
prefetch training circuitry configured to select a new offset from the list of candidate offset values to replace the current offset through a comparison of the plurality of candidate offset values against data indicative of recent requests issued to the storage structure, wherein the prefetch training circuitry is configured to identify a subset of the candidate offset values based on the current offset and to dynamically modify the default order to increase priority of the subset of the candidate offset values which are considered in the comparison.

Clause 2. The apparatus of clause 1, wherein the subset of the candidate offset values comprises one or more offset values of the plurality of candidate offset values that are an integer multiple of the current offset.

Clause 3. The apparatus of clause 1 or clause 2, wherein the subset of the candidate offset values comprises one or more offset values of the plurality of candidate offset values that when multiplied by an integer are equal to the current offset.

Clause 4. The apparatus of any preceding clause, wherein the subset of the candidate offset values comprises an offset value equal to a smallest addressable offset.

Clause 5. The apparatus of any preceding clause, wherein the prefetch training circuitry is configured to restrict the subset of the candidate offset values to candidate offset values within a predefined range.

Clause 6. The apparatus of any preceding clause, wherein the prefetch training circuitry is configured to restrict the subset of the candidate offset values to fewer than a predefined number of candidate offset values.

Clause 7. The apparatus of any preceding clause, wherein the prefetch training circuitry is configured to select the new offset during a training phase in which the candidate offset values are considered in turn.

Clause 8. The apparatus of clause 7, wherein the training phase comprises sequential consideration of a plurality of training sub-phases each of which comprises consideration of a corresponding plurality of sub-phase offsets comprising the subset of the candidate offset values and one or more of the plurality of candidate offset values selected based on the default order.

Clause 9. The apparatus of clause 8, wherein for each of the plurality of training sub-phases, the corresponding plurality of sub-phase offsets comprises the current offset.

Clause 10. The apparatus of clause 8 or clause 9, wherein the training phase comprises consideration of each of the plurality of sub-phases a single time.

Clause 11. The apparatus of any of clauses 8-10, wherein:
the training phase comprises, for each of the plurality of training sub-phases, performing a plurality of rounds of training for that sub-phase; and
each of the plurality of rounds of training comprises sequentially comparing each of the corresponding plurality of sub-phase offsets for that sub-phase to one of a sequence of current requests to the storage structure.

Clause 12. The apparatus of any of clauses 8-11, wherein the prefetch training circuitry is configured to remove duplicate candidate offset values from each of the corresponding plurality of sub-phase offsets.

Clause 13. The apparatus of any of clauses 8-12, wherein the prefetch training circuitry is configured to maintain a plurality of counters, each corresponding to one of the plurality of candidate offset values, and the training phase comprises:
for each of the plurality of candidate offset values, modifying a counter of the plurality of counters corresponding to that candidate offset value in response to a determination that the data indicative of recent requests indicates that an address difference between one of a current request and one of the recent requests is equal to that candidate offset value; and
selecting as the new offset, the candidate offset value corresponding to one of the plurality of counters indicating a highest frequency of occurrence of that candidate offset value.

Clause 14. The apparatus of clause 13, wherein:
the data indicative of recent requests comprises, for each of the recent requests, a timeliness hint indicator configured to indicate that requested data is timely when the requested data indicated in that recent request was already present in the storage structure on receipt of a corresponding demand request for the requested data;
the training phase comprises, for each of the plurality of candidate offset values and when modifying the counter corresponding to that candidate offset value:
modifying the counter by a first value in response to the determination when the timeliness hint indicator indicates that the requested data is not timely; and
modifying the counter by a second value, greater in magnitude than the first value, in response to the determination when the timeliness hint indicator indicates that the requested data is timely.

Clause 15. The apparatus of clause 13 or clause 14, wherein the prefetch training circuitry is responsive to identification of two or more candidate offset values having a same corresponding counter value to select, as the new offset, a candidate offset value of the two or more candidate offset values having a lowest magnitude.

Clause 16. The apparatus of any preceding clause, further comprising recent request storage to store the data indicative of recent requests, wherein the comparison of the plurality of candidate offset values against the data indicative of recent requests comprises performing a lookup in the recent request storage.

Clause 17. The apparatus of any preceding clause, wherein the storage structure is a cache.

Clause 18. The apparatus of any preceding clause, wherein the candidate offset values comprise positive offset values and negative offset values.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus comprising:
candidate offset storage circuitry configured to store a list comprising a plurality of candidate offset values having a default order;
prefetch circuitry configured to generate prefetch addresses by modifying a base address using a current offset of the plurality of candidate offset values, and to issue prefetch requests, each based on a corresponding one of the prefetch addresses, to cause information beginning at the corresponding prefetch address to be prefetched into the storage structure in anticipation of a demand request for that information being issued to the storage structure; and
prefetch training circuitry configured to select a new offset from the list to replace the current offset through a comparison of the plurality of the candidate offset values against data indicative of recent requests issued to the storage structure, wherein the prefetch training circuitry is configured to identify a subset of the candidate offset values based on the current offset and to dynamically modify the default order to increase priority of the subset of the candidate offset values which are considered in the comparison.

2. The apparatus of claim 1, wherein the subset of the candidate offset values comprises one or more offset values of the plurality of candidate offset values that are an integer multiple of the current offset.

3. The apparatus of claim 1, wherein the subset of the candidate offset values comprises one or more offset values of the plurality of candidate offset values that when multiplied by an integer are equal to the current offset.

4. The apparatus of claim 1, wherein the subset of the candidate offset values comprises an offset value equal to a smallest addressable offset.

5. The apparatus of claim 1, wherein the prefetch training circuitry is configured to restrict the subset of the candidate offset values to candidate offset values within a predefined range.

6. The apparatus of claim 1, wherein the prefetch training circuitry is configured to restrict the subset of the candidate offset values to fewer than a predefined number of candidate offset values.

7. The apparatus of claim 1, wherein the prefetch training circuitry is configured to select the new offset during a training phase in which the candidate offset values are considered in turn.

8. The apparatus of claim 7, wherein the training phase comprises sequential consideration of a plurality of training sub-phases each of which comprises consideration of a corresponding plurality of sub-phase offsets comprising the subset of the candidate offset values and one or more of the plurality of candidate offset values selected based on the default order.

9. The apparatus of claim 8, wherein for each of the plurality of training sub-phases, the corresponding plurality of sub-phase offsets comprises the current offset.

10. The apparatus of claim 8, wherein the training phase comprises consideration of each of the plurality of sub-phases a single time.

11. The apparatus of claim 8, wherein:
the training phase comprises, for each of the plurality of training sub-phases, performing a plurality of rounds of training for that sub-phase; and
each of the plurality of rounds of training comprises sequentially comparing each of the corresponding plurality of sub-phase offsets for that sub-phase to one of a sequence of current requests to the storage structure.

12. The apparatus of claim 8, wherein the prefetch training circuitry is configured to remove duplicate candidate offset values from each of the corresponding plurality of sub-phase offsets.

13. The apparatus of claim 8, wherein the prefetch training circuitry is configured to maintain a plurality of counters, each corresponding to one of the plurality of candidate offset values, and the training phase comprises:
for each of the plurality of candidate offset values, modifying a counter of the plurality of counters corresponding to that candidate offset value in response to a determination that the data indicative of recent requests indicates that an address difference between one of a current request and one of the recent requests is equal to that candidate offset value; and selecting as the new offset, the candidate offset value corresponding to one of the plurality of counters indicating a highest frequency of occurrence of that candidate offset value.

14. The apparatus of claim 13, wherein:
the data indicative of recent requests comprises, for each of the recent requests, a timeliness hint indicator configured to indicate that requested data is timely when the requested data indicated in that recent request was already present in the storage structure on receipt of a corresponding demand request for the requested data;
the training phase comprises, for each of the plurality of candidate offset values and when modifying the counter corresponding to that candidate offset value:
modifying the counter by a first value in response to the determination when the timeliness hint indicator indicates that the requested data is not timely; and
modifying the counter by a second value, greater in magnitude than the first value, in response to the determination when the timeliness hint indicator indicates that the requested data is timely.

15. The apparatus of claim 13, wherein the prefetch training circuitry is responsive to identification of two or more candidate offset values having a same corresponding counter value to select, as the new offset, a candidate offset value of the two or more candidate offset values having a lowest magnitude.

16. The apparatus of claim 1, further comprising recent request storage to store the data indicative of recent requests, wherein the comparison of the plurality of candidate offset values against the data indicative of recent requests comprises performing a lookup in the recent request storage.

17. The apparatus of claim 1, wherein the storage structure is a cache.

18. The apparatus of claim 1, wherein the candidate offset values comprise positive offset values and negative offset values.

19. A method of operating an apparatus comprising:
storing a list comprising a plurality of candidate offset values having a default order;
generating prefetch addresses by modifying a base address using a current offset of the plurality of candidate offset values, and issuing prefetch requests, each based on a corresponding one of the prefetch addresses, to cause information beginning at the corresponding prefetch address to be prefetched into the storage structure in anticipation of a demand request for that information being issued to the storage structure; and selecting a new offset from the list to replace the current offset through a comparison of the plurality of the candidate offset values against data indicative of recent requests issued to the storage structure, wherein the selecting comprises identifying a subset of the candidate offset values based on the current offset and dynamically modifying the default order to increase priority of the subset of the candidate offset values which are considered in the comparison.

20. A non-transitory computer readable storage medium to store computer-readable code for fabrication of an apparatus comprising:
candidate offset storage circuitry configured to store a list comprising a plurality of candidate offset values having a default order;
prefetch circuitry configured to generate prefetch addresses by modifying a base address using a current offset of the plurality of candidate offset values, and to issue prefetch requests, each based on a corresponding one of the prefetch addresses, to cause information beginning at the corresponding prefetch address to be prefetched into the storage structure in anticipation of a demand request for that information being issued to the storage structure; and
prefetch training circuitry configured to select a new offset from the list to replace the current offset through a comparison of the plurality of the candidate offset values against data indicative of recent requests issued to the storage structure, wherein the prefetch training circuitry is configured to identify a subset of the candidate offset values based on the current offset and to dynamically modify the default order to increase priority of the subset of the candidate offset values which are considered in the comparison.

* * * * *